United States Patent [19]
d'Hooghe et al.

[11] Patent Number: 6,117,943
[45] Date of Patent: Sep. 12, 2000

[54] COMPOSITIONS CONTAINING A POLYARYLENE ETHER AND A DISPERSIBLE REACTIVE SOLVENT AND ARTICLES PREPARED THEREFROM

[75] Inventors: Edward Louis d'Hooghe, Hulst, Netherlands; Jenö Kurja, Spartanburg, S.C.

[73] Assignee: The Dow Chemical Company, Midland, Mich.

[21] Appl. No.: 09/259,994

[22] Filed: Mar. 1, 1999

Related U.S. Application Data

[60] Provisional application No. 60/076,875, Mar. 5, 1998, and provisional application No. 60/109,582, Nov. 23, 1998.

[51] Int. Cl.$^7$ .............................. C08L 51/06; C08L 71/10; C08L 75/04
[52] U.S. Cl. .............................. 525/68; 525/123; 525/125; 525/132; 525/152; 525/395; 525/452; 525/905; 524/590
[58] Field of Search .............................. 525/68, 123, 125, 525/132, 152, 905, 452, 395; 524/590

[56] References Cited

U.S. PATENT DOCUMENTS

| | | | |
|---|---|---|---|
| 3,379,792 | 4/1968 | Finholt . | |
| 3,383,435 | 5/1968 | Cizek . | |
| 3,642,964 | 2/1972 | Rausch | 264/40 |
| 3,933,941 | 1/1976 | Yonemitsu . | |
| 3,959,211 | 5/1976 | Cooper . | |
| 4,385,133 | 5/1983 | Alberino | 521/159 |
| 4,446,278 | 5/1984 | Loucks | 525/92 |
| 4,522,975 | 6/1985 | O'Connor | 524/702 |
| 4,804,712 | 2/1989 | Traugott | 525/152 |
| 5,068,306 | 11/1991 | Harris | 528/68 |
| 5,167,899 | 12/1992 | Jezic | 264/510 |
| 5,318,813 | 6/1994 | Flexman, Jr. | 525/131 |
| 5,574,092 | 11/1996 | OrIani | 524/590 |
| 5,686,539 | 11/1997 | Nagaoka | 525/395 |

FOREIGN PATENT DOCUMENTS

| | | |
|---|---|---|
| 97/21771 | 6/1997 | Japan . |
| 97/06209 | 2/1997 | WIPO . |

OTHER PUBLICATIONS

Venderbosch, R. W., Processing of intractable polymers using reactive solvents: 2. Poly(2,6–dimethyl–1,4–phenylene ether) as a matrix material for high performance composites, Polymer, vol. 36, No. 6, (1995).

Venderbosch, R. W., Processing of intractable polymers using reactive solvents: 3. Mechanical properties of poly(2, 6–dimethyl–1,4–phenylene ether) processed by using various epoxy resin systems, Polymer, vol. 36, No. 15, (1995).

Venderbosch, R. W., Processing of intractable polymres using reactive solvents: 1. Poly(2,6–dimethyl–1,4–phenylene ether)/epoxy resin, Polymer, vol. 35, No. 20, (1994).

*Primary Examiner*—Mark L. Warzel
*Attorney, Agent, or Firm*—Reid S. Willis

[57] ABSTRACT

A blend of a polyarylene ether and a dispersible reactive solvent such as a thermoplastic polyurethane or a cyclopentadiene can be processed at temperatures below the oxidative degradation temperature of the polyarylene ether, yet form an article upon cooling that substantially retains the properties of the polyarylene ether.

17 Claims, No Drawings

COMPOSITIONS CONTAINING A POLYARYLENE ETHER AND A DISPERSIBLE REACTIVE SOLVENT AND ARTICLES PREPARED THEREFROM

CROSS REFERENCE STATEMENT

This application claims the benefit of U.S. Provisional Application Ser. Nos. 60/076,875, filed on Mar. 5, 1998, and 60/109,582, filed on Nov. 23, 1998.

BACKGROUND OF THE INVENTION

The present invention relates to a composition comprising a polyarylene ether and a dispersible reactive solvent. Polyarylene ethers (PAEs) are a class of thermoplastic resins with excellent mechanical and electrical properties, heat resistance, flame retardancy, low moisture absorption, and dimensional stability. These resins are widely used in automobile interiors, particularly instrument panels, and electrical as well as electronic applications.

PAEs are very difficult to process (for example, by injection molding) as a result of their high melt viscosities and their high processing temperature relative to their oxidative degradation temperature. Consequently, PAEs are commonly blended with compatible polymers such as polystyrene (WO 97/21771 and U.S. Pat. No. 4,804,712); polyamides (U.S. Pat. No. 3,379,792); polyolefins (U.S. Pat. No. 3,351,851); rubber-modified styrene resins (U.S. Pat. Nos. 3,383,435 and 3,959,211, and Ger. Offen. No. 2,047,613); and mixtures of polystyrene and polycarbonate (U.S. Pat. Nos. 3,933,941 and 4,446,278). Unfortunately, improvements in processing have generally been obtained at the expense of flexural modulus, flexural strength, or heat distortion temperature.

Epoxy resins have also been investigated as a reactive solvent for the PAE. (See Venderbosch, R. W., "Processing of Intractable Polymers using Reactive Solvents," Ph.D. Thesis, Eindhoven (1995); Vanderbosch et al., *Polymer*, Vol. 35, p. 4349 (1994); Vanderbosch et al., *Polymer*, Vol. 36, p. 1167 (1995a); and Vanderbosch et al., *Polymer*, Vol. 36, p. 2903 (1995b)). In this instance, the PAE is first dissolved in an epoxy resin to form a solution that is preferably homogeneous. An article is then shaped from the solution, and the solution is cured at elevated temperatures, resulting in a phase separation that can give a continuous PAE phase with epoxy domains interspersed therein. The properties of the finished article are primarily determined by the PAE; however, the use of an epoxy resin as a reactive solvent for the PAE is not practical in a continuous melt process like injection molding because the epoxy resin needs a curing agent to set. The curing agent will, over time, accumulate in the injection molding barrel, thereby fouling the machine. Furthermore, the cure and subsequent phase separation has to take place at at least 150° C., which is impractical in a molder environment.

In view of the deficiencies in the art, it would be desirable to find a reactive solvent that would solve the processing problems inherent in some reactive solvents for PAE, without deleteriously affecting the physical properties of the PAE.

SUMMARY OF THE INVENTION

The present invention addresses a need in the art, by providing in one aspect, a composition that comprises a melt of a polyarylene ether and a reactive solvent which is a thermoplastic polyurethane or a cyclopentadiene, wherein the polyarylene ether is represented by the formula:

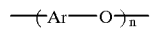

where Ar is a substituted or unsubstituted aromatic nucleus and n is an integer of at least 10, with the proviso that when the reactive solvent is a thermoplastic polyurethane having a Tg of less than 50° C., the polyarylene ether and the reactive solvent comprise at least 60 weight percent of the composition.

In a second aspect, the present invention is an article that comprises a dispersion of: a) a dispersible reactive solvent which is a thermoplastic polyurethane or a cyclopentadiene; and b) a polyarylene ether represented by the formula:

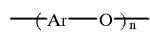

where Ar is a substituted or unsubstituted aromatic nucleus and n is an integer of at least 10, with the proviso that when the reactive solvent is a thermoplastic polyurethane having a $T_g$ of less than 50° C., the polyarylene ether and the reactive solvent comprise at least 60 weight percent of the composition.

In another aspect the present invention is a composition that comprises a melt of a polyarylene ether and a thermoplastic polyurethane having a $T_g$ of not less than 50° C., wherein the polyarylene ether is represented by the formula:

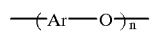

where Ar is a substituted or unsubstituted aromatic nucleous and n is an integer of at least 10.

TPUs are depolymerizable at advanced temperatures, resulting in a dramatic decrease in melt viscosity, and repolymerizable at reduced temperatures. Similarly, cyclopentadienes undergo retro Diels-Alder reactions at advanced temperatures and, upon cooling and in the presence of a suitable catalyst, build molecular weight to re-form a polycyclopentadiene. Thus, TPUs and cyclopentadienes advantageously set without addition of heat. Moreover, the PAE/TPU or PAE/cyclopentadiene melt blends are advantageously homogeneous, while the cooled articles are phase separated. This feature allows the melt to be processable at temperatures below the degradation temperature of the PAE, yet retain the properties of the unadulterated PAE.

DETAILED DESCRIPTION OF THE INVENTION

In one aspect, the present invention is a melt comprising a PAE and a TPU or a cyclopentadiene, preferably a TPU. The PAE is represented by the following formula:

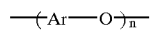

where Ar is a substituted or unsubstituted aromatic nucleus and n is an integer of at least 10. The aromatic nucleus can be, for example, phenylene, alkylated phenylene, chlorophenylene, bromophenylene, and naphthalene. Ar is preferably 2,6-dimethyl-1,4-phenylene, 2-methyl-6-ethyl-1, 4-phenylene, 2,6-diethyl-1,4-phenylene, and 2,3,6-trimethyl-1,4-phenylene; Ar is more preferably 2,6-dimethyl-1,4-phenylene. Preferred PAEs are poly(2,6- dimethyl-1,4-phenylene) ether and the copolymer obtained by the polymerization of 2,6-dimethyl phenol and 2,3,6-trimethyl phenol, with poly(2,6-dimethyl-1,4-phenylene) ether being more preferred.

As used herein the term "dispersible reactive solvent" refers to a substance that forms a solution with the PAE at an advanced temperature, and that forms a heterogeneous dispersion with the PAE upon cooling. The solution is preferably a homogeneous solution, and the dispersible reactive solvent is preferably the dispersed phase. Examples of such dispersible reactive solvents include thermoplastic polyurethanes (TPUs) and cyclopentadienes, with TPUs being preferred.

TPUs contain structural units formed from the reaction of a polyisocyanate, a polyfunctional chain extender, and optionally, a high molecular weight polyol. The polyisocyanate that is used to form the TPU is preferably a diisocyanate, which may be aromatic, aliphatic, or cycloaliphatic. Representative examples of these preferred diisocyanates can be found in U.S. Pat. Nos. 4,385,133, 4,522,975, and 5,167,899, the disclosure of which diisocyanates are incorporated herein by reference. Preferred diisocyanates include 4,4'-diisocyanatodiphenyl-methane, p-phenylene diisocyanate, 1,3-bis(isocyanatomethyl) cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanatodicyclohexylmethane and 4,4'-diisocyanatodiphenylmethane.

As used herein, the term "polyfunctional chain extender" refers to a low molecular polyol, preferably a diol having a molecular weight of not greater than 200. Preferred chain extenders include ethylene glycol, 1,3-propanediol, 1,4-butanediol, 1,5-pentanediol, 1,6-hexanediol, diethylene glycol, triethylene glycol, tetraethylene glycol, neopental glycol, 1,4-cyclohexanedimethanol, and 1,4-bishydroxyethylhydroquinone, and combinations thereof. Particularly preferred difunctional chain extenders include 1,6-hexanediol and mixtures of 1,4-butane diol and diethylene glycol, 1,4-butane diol and triethylene glycol, and 1,4-butane diol and tetraethylene glycol.

The TPU may also include units formed from the reaction of an aromatic diol, preferably at a sufficient concentration to lower the temperature at which the rigid TPU can be melt processed. Such TPUs are disclosed in U.S. Pat. No. 5,574,092, incorporated herein by reference. Examples of suitable aromatic diols include resorcinol, catechol, hydroquinone, dihydroxynaphthalenes, dihydroxyanthracenes, bis(hydroxyaryl)fluorenes, dihydroxyphenanthrenes, dihydroxybiphenyls, and bis(hydroxyphenyl) propanes. Preferred aromatic diols include hydroquinone, 4,4'-dihydroxybiphenyl, 9,9-bis(4-hydroxyphenyl) fluorene, and bisphenol A.

When the aromatic diol is used, the amount of the aromatic diol preferably does not exceed an amount that causes the tensile elongation at break of the TPU to be less than 5 percent, as determined by ASTM D-638. Preferably, the concentration of the aromatic diol is not less than 0.1, more preferably not less than 0.5, and most preferably not less than 1 mole percent, and preferably not more than 20, more preferably not more than 10, and most preferably not more than 5 mole percent, based on the total moles of diol used to prepare the TPU.

The term "high molecular weight polyol" is used herein to refer to a polyol, preferably a diol having a molecular weight of not less than about 500 amu, preferably not less than about 600 amu, more preferably not less than about 1000 amu, and preferably not more than about 6000 amu, more preferably not more than about 3000 amu, and most preferably not more than about 2000 amu. Examples of the optional high molecular weight diols include polyether glycols such as polypropylene glycol, polyethylene glycol, and polytetramethylene glycol; and polyester glycols such as polycaprolactone glycol, as well as compounds that can be prepared from the condensation reaction of an aliphatic diacid, diester, or di(acid chloride) with a $C_2$–$C_8$ linear, branched, or cyclic diol, or an ether-containing diol, or blends thereof. More preferred high molecular weight polyester glycols include polycaprolactone glycol, polyethylene adipate glycol, and polybutylene adipate glycol.

The TPUs are advantageously prepared in the presence of a suitable catalyst such as those disclosed in U.S. Pat. No. 5,068,306, column 5, line 46 to column 6, line 5, which disclosure is incorporated herein by reference. Preferred catalysts include stannous octoate, stannous oleate, dibutyltin dioctoate, and dibutyltin dilaurate. The amount of catalyst used is sufficient to increase the reactivity of an isocyanate group with an OH group without undesirably affecting the properties of the final product, and is preferably in the range of about 0.02 to about 2.0 weight percent based on the total weight of the reactants.

The isocyanate-to-OH ratio of the reactants is preferably not less than about 0.95:1, more preferably not less than about 0.975:1, and most preferably not less than about 0.985:1, and preferably not greater than about 1.05:1, preferably not greater than about 1.025:1, and most preferably not greater than about 1.015:1.

TPUs can be suitably prepared by batch or continuous processes such as those known in the art. A preferred continuous mixing process is reactive extrusion, such as the twin screw extrusion process disclosed in U.S. Pat. No. 3,642,964, the description of which process is incorporated herein by reference.

TPUs suitable for use as a reactive solvent for the PAE may be rigid TPUs or soft TPUs. Rigid TPUs have a glass transition temperature ($T_g$) of not less than 50° C., and are further characterized by having a hard segment (that is, structural units formed from the polymerization of polyisocyanate and the difunctional chain extender) of preferably not less than about 75, and more preferably not less than about 90 weight percent, based on the weight of the TPU, and as much as about 100 weight percent. A commercially available class of rigid TPUs include ISOPLAST™ polyurethane engineering thermoplastic resins (a trademark of The Dow Chemical Company).

Soft TPUs have a $T_g$ of less than 50° C., preferably less than 25° C., and are further characterized by having a hard segment of not more than 75 weight percent, based on the weight of the TPU. Examples of preferred soft TPUs are PELLETHANE™ thermoplastic polyurethanes (a trademark of The Dow Chemical Company).

An unusual feature of a PAE/TPU blend is that the mixture is homogeneous as a melt, but becomes heterogeneous as the melt cools. The homogeneity of the melt allows the blend to be processable at a temperature below the oxidative degradation temperature of the PAE; as the melt is cooled, the TPU phase segregates and the TPU forms a dispersion in a PAE continuous phase so that the physical properties of the final article (for example, the heat distortion temperature, the flexural modulus and the flexural strength) are more like the unadulterated PAE.

The weight-to-weight ratio of the PAE to the TPU in the melt blend (as well as in the final article) is generally greater than 1:1. It is also possible to include other thermoplastic polymers in the PAE/TPU blend, such as polystyrene (PS), syndiotactic PS, or polyvinylcyclohexane. The PAE/TPU blends are particularly useful in injection molding applications that require the maintenance of the high heat properties of the PAE.

The following examples are for illustrative purposes only and are not intended to limit the scope of this invention.

EXAMPLES 1–6

Various blends of poly(2,6-dimethyl-1,4-phenylene ether) (PPO 803, obtained from General Electric Plastics, Bergen op Zoom, The Netherlands) were prepared with a rigid TPU (ISOPLAST™ 2530 polyurethane engineering thermoplastic resin, a trademark of The Dow Chemical Company) or a soft TPU (PELLETHANE™ 2102-75A thermoplastic polyurethane resin, a trademark of The Dow Chemical Company) and optionally, polystyrene N5000 resin (obtained from Shell, weight average molecular weight is 305,000; $M_w/M_n$ is 2.37).

Samples of the PPO resin and the polystyrene were prepared in a single screw extruder at 245° C. for the 50/50 weight-to-weight ratio, and at 250° C. for the 75/25 weight-to-weight ratio. These samples were granulated and tumble blended with the rigid TPU or the soft TPU and then mixed in an Arburg 270M single screw injection molding machine at different temperature profiles, pressures, and mold temperatures as illustrated in Table 1. Samples of the PPO resin and the TPUs were prepared in the injection molding machine. The PPO/soft TPU blend was first mixed in a double roll mixer at 245° C., due to the difficulty in pulverizing the soft TPU.

TABLE 1

Molding Conditions for Producing Placques

| Sample (w/w) | Temperature profile (° C.) | P (bar) | Mold T (° C.) |
|---|---|---|---|
| 70 PPE/30 rigid TPU | 235/240/245/250/250 | 1860 | 60 |
| 70 (50 PPE-50 PS) 30 rigid TPU | 230/240/250/260/260 | 1700 | 30 |
| 70 (50 PPE-50 PS) 30 soft TPU | 230/240/250/260/260 | 1700 | 30 |
| 70 (75 PPE-25 PS) 30 rigid TPU | 270/280/290/295/300 | 1860 | 30 |
| 70 (75 PPE-25 PS) 30 soft TPU | 240/250/260/265/270 | 1550 | 30 |

The $T_g$s of the various samples were analyzed using dynamic mechanical thermal analysis. Two $T_g$s were observed in every case. The samples were polished to 1-mm and 3-mm thicknesses and to 13-mm and 25-mm lengths, and analyzed in tensile mode (1Hz) using a heating rate of 2° C./minute Table 11 illustrates the Tg, the flex modulus, and the flex strength of the various samples.

TABLE 2

Physical Properties of PPE TPU Blends

| Sample (w/w) | $T_g$ (° C.) | Flex Modulus (MPa) | Flex Strength (MPa) |
|---|---|---|---|
| 70 PPE/30 rigid TPU | 110, 230 | 4.6 | 26 |
| 70 (50 PPE-50 PS) 30 rigid TPU | 110, 164 | 3.3 | 32 |
| 70 (50 PPE-50 PS) 30 soft TPU | −40, 164 | 2.0 | 16 |
| 70 (75 PPE-25 PS) 30 rigid TPU | 110, 190 | 3.1 | 35 |
| 70 (75 PPE-25 PS) 30 soft TPU | −40, 191 | 2.8 | 21 |

What is claimed is:

1. A composition that comprises a melt of a polyarylene ether and a thermoplastic polyurethane having a $T_g$ of not less than 50° C. and a hard segment of not less than about 75 weight percent, based on the weight of the thermoplastic polyurethane, wherein the polyarylene ether is represented by the formula:

where Ar contains an aromatic nucleus and n is an integer of at least 10.

2. The composition of claim 1 wherein Ar is 2,6-dimethyl-1,4-phenylene, 2-methyl-6-ethyl-1,4-phenylene, 2,6-diethyl-1,4-phenylene, or 2,3,6-trimethyl-1,4-phenylene, or a combination thereof.

3. The composition of claim 1 wherein the polyarylene ether is a poly(2,6-dimethyl-1,4-phenylene) ether or the copolymer obtained by the polymerization of 2,6-dimethyl phenol and 2,3,6-trimethyl phenol.

4. The composition of claim 1 which further includes an additional thermoplastic polymer or an impact modifier or both.

5. The composition of claim 4 which includes polystyrene.

6. The composition of claim 4 which includes a polystyrene-butadiene graft rubber.

7. The composition of claim 1 wherein the thermoplastic polyurethane includes structural units formed from an aromatic diol.

8. The composition of claim 7 wherein the aromatic diol is hydroquinone, 4,4'-dihydroxybiphenyl, 9,9-bis(4-hydroxyphenyl) fluorene, or bisphenol A, or a combination thereof.

9. The composition of claim 7 wherein the concentration of structural units formed from the aromatic diol is not less than about 1 mole percent and not more than 10 mole percent, based on the total moles of diol used to prepare the thermoplastic polyurethane.

10. A composition that comprises a melt of a polyarylene ether and a thermoplastic polyurethane having a $T_g$ of not less than 50° C. and a hard segment of not less than about 75 weight percent, based on the weight of the thermoplastic polyurethane, wherein the polyarylene ether is represented by the formula:

where n is an integer of at least 10 and Ar is 2,6-dimethyl-1,4-phenylene; 2-methyl-6-ethyl-1,4-phenylene; 2,6-diethyl-1,4-phenylene; or 2,3,6-trimethyl-1,4-phenylene; or a combination thereof.

11. The composition of claim 10 wherein the polyarylene ether is a poly(2,6-dimethyl-1,4-phenylene) ether or the copolymer obtained by the polymerization of 2,6-dimethyl phenol and 2,3,6-trimethyl phenol.

12. The composition of claim 10 which further includes an additional thermoplastic polymer.

13. The composition of claim 12 which includes polystyrene or a polystyrene-butadiene graft rubber.

14. An article that comprises a dispersion of a thermoplastic polyurethane having a $T_g$ of not less than 50° C. in a polyarylene ether represented by the formula:

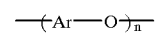

where n is an integer of at least 10 and Ar is 2,6-dimethyl-1,4-phenylene; 2-methyl-6-ethyl-1,4-phenylene; 2,6- diethyl-1,4-phenylene; or 2,3,6-trimethyl-1,4-phenylene; or a combination thereof.

15. The article of claim 14 which further includes an additional thermoplastic polymer or an impact modifier or both.

16. The article of claim 15 which includes polystyrene.

17. The article of claim 15 which includes a polystyrene-butadiene graft rubber.

* * * * *